United States Patent [19]

Kane et al.

[11] 4,012,483
[45] Mar. 15, 1977

[54] SEPARATION OF COBALT FROM NICKEL IN AMMONIACAL SOLUTIONS USING 8-HYDROXYQUINOLINES

[75] Inventors: William S. Kane, Wicomic; Paul H. Cardwell, Zanoni, both of Va.

[73] Assignee: Deepsea Ventures, Inc., Gloucester Point, Va.

[22] Filed: Nov. 17, 1975

[21] Appl. No.: 632,201

Related U.S. Application Data

[63] Continuation of Ser. No. 453,297, March 21, 1974, abandoned, which is a continuation-in-part of Ser. No. 279,901, Aug. 11, 1972, abandoned, which is a continuation of Ser. No. 40,730, May 26, 1970, abandoned.

[52] U.S. Cl. .................................. 423/24; 423/139
[51] Int. Cl.$^2$ ................. C01G 51/00; C01G 53/12; C01G 3/00
[58] Field of Search ......... 423/24, 139; 75/101 BE, 75/119

[56] References Cited

UNITED STATES PATENTS 3,380,801  4/1968  Williams et al. .............. 423/139 X
3,637,711  1/1972  Budde et al. .................. 75/101 BE
3,743,585  7/1973  Lowenhaupt et al. ............... 75/119

OTHER PUBLICATIONS

Morrison et al. *Solvent Extraction in Analytical Chemistry* John Wiley and Sons, New York 1957 pp. 164.

*Primary Examiner*—G. O. Peters
*Assistant Examiner*—Brian E. Hearn
*Attorney, Agent, or Firm*—Barry G. Magidoff

[57] ABSTRACT

This invention provides a method for selectively extracting cobalt value from an aqueous ammoniacal solution containing dissolved nickel and cobalt. The solution is contacted, at a pH of at least about 8.5, with an organic solution of a hydrocarbon-substituted 8-hydroxyquinoline while maintaining the pH of the aqueous solution at least at about 8.5. by adding ammonia or ammonium hydroxide. There are also dissolved in the aqueous solution ammonium ion and halide ion. The cobalt value is selectively extracted into the organic solution which is then separated from the aqueous solution; the cobalt can be stripped from the organic solution.

20 Claims, No Drawings

SEPARATION OF COBALT FROM NICKEL IN AMMONIACAL SOLUTIONS USING 8-HYDROXYQUINOLINES

This is a continuation of application Ser. No. 453,297, filed Mar. 21, 1974, which is a continuation-in-part of co-pending application Ser. No. 279,901, filed Aug. 11, 1972, which is in turn a continuation of application Ser. No. 40,730, filed May 26, 1970, all now abandoned.

Hydrometallurgy has become an increasingly important procedure in the refining of the relatively more precious nonferrous metals, especially metals such as nickel, cobalt, copper and manganese. These procedures are all based upon the property of certain liquid solutions, which are generally immiscible with water, to be selective for extracting one or more desired metal values from an aqueous solution with which it is contacted. Such useful liquid extracting agents are generally organic solutions which include the liquid ion exchange reagents, such as certain organic phosphoric acid compounds, such as the dialkyl phosphoric acids disclosed by Olsen et al in U.S. Pat. No. 3,104,971 the alpha-hydroxyoximes described in several patents to Swanson, for example, U.S. Pat. Nos. 3,224,873 and 3,428,449 as well as certain more recently developed chelating, or liquid ion exchange, reagents, the substituted hydroxyquinolines, developed apparently initially by Budde Jr. et al., and are disclosed in published South African Specification No. 69/4397.

Other liquid extraction agents, include, for example, carboxylic acids, such as the naphthenic acids, disclosed by Williams et al in U.S. Pat. No. 3,380,301.

A major problem in the hydrometallurgical field, and one which is especially significant commercially, is the difficulty of separating cobalt value from nickel value in aqueous solutions.

Williams et al, in U.S. Pat. No. 3,380,801, assert the ability to make a clean separation of nickel and cobalt, but do not present any quantitative data to support this blanket assertion. Williams et al utilize as the separation agents the naphthenic carboxylic acids and, specifically, oleic acid, in carrying out this separation. Other examples of such alleged preferential extraction separation, in which it is believed the separation of the two metals is substantially incomplete, are disclosed by Ashbrook, in U.S. Pat. No. 3,455,680, who disclose the use of liquid ion exchange of aqueous solutions, using an alpha-hydroxy oxime and di-2-ethylhexyl phosphoric acid (EHPA) to make the separation. Cook et al, U.S. Pat. No. 3,666,446, suggest the use of organic amines in conjunction with the use of a "cationic extractant", such as EHPA, for the adjusting of solution pH. Cook et al suggest that the amines themselves are not generally suitable for a complete extraction process.

Drobnick in U.S. Pat. No. 3,276,863, discloses the separation of nickel from cobalt from an aqueous ammoniacal solution, using alpha-hydroxyoximes. Drobnick, however, shows that nickel is preferentially extracted from this ammoniacal solution, which also contains cobalt. Further, Orlandini et al, in U.S. Pat. No. 3,479,378, also discloses the use of an alpha-hydroxyoxime at a pH of about 6, utilizing ammonium hydroxide as a pH control agent, where the cobalt continues to be extracted, with nickel.

The uses of organic amines in the separation of nickel, copper and cobalt from solutions containing one or more of these metals, in combination with other metals, have also been disclosed, for example, in U.S. Pat. Nos. 3,128,756; 3,003,866; 3,131,998; and 3,449,246. Other separation agents and procedures are shown in U.S. Pat. Nos. 2,822,264; 3,251,646; and 3,082,081. None of the suggested procedures resulted in a clean separation of nickel from cobalt, and the production of pure solutions of both nickel salt and cobalt salt, respectively.

Swanson, in U.S. Pat. No. 3,244,873, describes the extraction of various metal values using alpha-hydroxyoxime. Amongst the materials that are extracted, are, for example, the nickel and cobalt values shown in examples II–IV, on column 5 of the patent. Referring to Tables 2 and 3, it is noted that as pH increases, i.e. from about 3 to about 7.5, the extraction of both nickel and cobalt from an aqueous solution also increases from about less than 1% to about 35% or 36%. There is no indication given that the separation of nickel from cobalt can be accomplished using an alpha-hydroxyoxime.

The present invention, permits the separation of cobalt from nickel values from a basic, aqueous solution having a pH of at least about 8 to obtain individual aqueous solutions of a nickel salt and a cobalt salt, respectively. Although nickel and cobalt salts per se are not soluble at such a high pH range, complex ions, such as ammonia complexes, are soluble. Specifically, the present process provides means for providing this separation utilizing ammoniacal solutions of these metal values, such as are obtained in certain hydrometallurgical processes from, e.g., ocean floor nodule ore.

In accordance with the present invention, cobalt can be selectively extracted from a pregnant ammoniacal aqueous solution containing a dissolved cobalt salt and a dissolved nickel salt, and dissolved ammonium halide, the method comprising: contacting the pregnant, ammoniacal aqueous solution, having a pH of at least about 8.5, with an organic, water-immiscible, liquid ion exchange medium comprising a hydrocarbon-substituted-8-hydroxyquinoline ion exchange agent, while maintaining the pH of the aqueous solution in the range of at least about 8.5, so as to extract cobalt preferentially from the aqueous solution into the organic solution, to thus form an organic extract phase containing the major portion of the cobalt value dissolved therein and a raffinate aqueous phase containing a major portion of the nickel value dissolved therein; and separating the organic phase from the aqueous phase. It has been found that the preferential, extraction of the cobalt from the nickel is preferably carried out at a pH in the range of at least about 9 and most advantageously carried out at a pH in the range of from about 9 to about 10. A pH in the range of from about 9.1 to about 9.4 has been found to be a desirable range of alkalinity at which to carry out the extraction;

The nickel and the cobalt are maintained in solution at these basic pH's by the formation of soluble complexes thereof, in accordance with conventional procedures, and preferably ammonia complexes. The concentration of ammonia in the pregnant aqueous solution must be sufficient to maintain the nickel and cobalt ions in solution at whatever pH is maintained during the course of the extraction procedure. It is believed that the presence of ammonia in the aqueous solution results in the formation of a nickel-ammonia complex and a cobalt-ammonia complex, which are soluble at the basic pH's required for this extraction procedure, whereas the non-complexed nickel and cobalt ions are not soluble at such pH values.

There must also be present in the aqueous solution ammonium ion ($NH_4^+$) and halide ion, e.g. $Cl^-$. Preferably, there is at least about 7 gms/l of ammonium halide, measured as the ammonium ion in the ammoniacal solution, and most preferably at least about 13 gms/l, e.g. about 20 gms/l ammonium chloride would be the preferred minimum and about 38 gms/l most preferred.

The term "halide", as used herein is defined as encompassing the chloride, bromide and iodide; because of ready availability, the chloride is most preferred.

Subsequent to separating the cobalt-containing organic extract solution from the aqueous raffinate, the cobalt can be stripped from the extract by contacting the extract with an aqueous solution suitable for stripping the cobalt value from the extract phase. If any nickel value had been removed simultaneously with the cobalt from the aqueous solution, it can be preferentially stripped from the extract by contacting the extract initially with, for example, a weak acid wherein sufficient hydrogen ions are present to substitute for all of the nickel in the extract phase. The cobalt cannot be extracted utilizing a weak acid, but requires, for example, 6 Normal hydrogen and halide ions, e.g. 6 Normal HCl.

The ion exchange agents used in accordance with the present process, i.e., the hydrocarbon-substituted-8-hydroxyquinolines, are capable of extracting metal values other than cobalt at the pH values at which this process can be carried out. Accordingly, if the aqueous ammoniacal feed solution, for the present process, contains, in addition to nickel and cobalt, a metal value such as copper, this can also be extracted together with the cobalt into the extract phase. The presence of such a metal value as copper in the aqueous solution will not interfere directly with the preferential extraction of the cobalt from the nickel, but would require that additional liquid ion exchange agent be present sufficient to extract not only all of the cobalt but whichever of other metal values which are present would be extracted by these agents. Any such other metal values can be removed prior to the nickel-cobalt separation, or can be extracted along with cobalt and then a subsequent separation can be made between cobalt and such other metals, e.g., copper. In the preferred procedure, any, for example, copper, would be separated from the nickel and cobalt prior to the preferential extraction of the cobalt from the nickel, in accordance with the present process.

In order to maintain the pH of the aqueous solution in the desired range during the liquid ion exchange extraction procedure, it is generally necessary to add a basic reagent while the aqueous and organic phases are being mixed. The liquid ion exchange reagents, although chelates, act by releasing hydrogen ion to the aqueous phase when the metal values are extracted into the organic phase; thus the pH would tend to decrease during extracting, unless a basic reagent is added. It is preferred that ammonium hydroxide or ammonia gas be utilized as the basic reagent. Ammonium hydroxide can be added during the course of extraction, as required, or ammonia gas bubbled therethrough.

The nickel and cobalt values can be present in the aqueous solution in association with any anions, for example, the halides, especially chloride, or sulfate, nitrate, or acetate. It is only necessary that the nickel and cobalt be soluble in the ammoniacal aqueous solutions so that they can be extracted by the ion exchange agents.

Such aqueous solutions, which include dissolved nickel and cobalt ions, are formed in a variety of different hydrometallurgical procedures. A suitable aqueous solution of nickel and cobalt sulfate can be formed by the reduction of ocean floor nodules with, e.g. carbon monoxide, followed by leaching with an aqueous solution of ammonium hydroxide and ammonium halide.

If desired, any other metal values present in the aqueous solution can be removed prior to carrying out the process of the present invention. For example, copper value can be selectively extracted from the aqueous solution prepared above.

Metal values other than the nickel can be also selectively stripped from the organic extract phase prior to stripping of the cobalt by contacting the organic phase with a weakly acid aqueous solution (for example, a solution of from about 0.1 Normal to about 1 Normal in hydrogen ion), containing sufficient total amounts of hydrogen ion to be selectively exchanged for all of the metal values, such as copper that may be present. Such useful stripping acids, in dilute concentrations, include, for example, sulfuric acid, nitric acid, chloracetic acid, hydrochloric acid, hydrobromic acid and hydroiodic acid. The metal value is stripped as a salt of the acid used.

Cobalt is stripped from the organic phase by utilizing a strong mineral acid aqueous solution, having a concentration of at least 6 Normal in hydrogen ion and 6 Normal in chloride ion. Concentrated hydrochloric acid, containing preferably at least about 20% by weight HCl, is preferred.

The 8-hydroxyquinoline compounds, which are especially useful for the separation of the metal values in accordance with the present process, can generally be defined by the following formula:

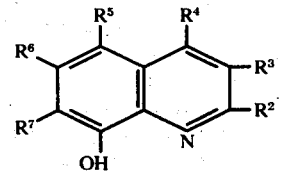

wherein each of the R groups can be hydrogen or a hydrocarbyl group or inertly-substituted hydrocarbon groups, such as alkenyl, alkyl, alkynyl, cycloalkyl, cycloalkenyl, aryl or combinations thereof, such as alkaryl, aralkyl, aralkenyl, alkyl-cycloalkyl, etc.

At least one of the R groups, however, must be a hydrocarbon group. Any inert substituent can be present, as long as it does not adversely affect the solubility of the substituted 8-hydroxyquinolines in organic solvents nor adversely affect the solubility in the organic solvent of the metal chelate formed therefrom.

The resulting metal chelate must remain soluble at least to the extent of approximately 2% by weight in the organic solvent.

The preferred position of the hydrocarbyl substituent of the 8-hydroxyquinoline nuclear structure is such as to preferentially complex with the desired metal ion in the aqueous solution. The sum of the carbon atoms in the R groups must be at least about 8 and can be high as 24 or more. The preferred R groups are alkylbenzyl groups or beta-alkenyl groups containing from 12 to 18 carbon atoms, preferably attached at the $R^5$, $R^6$, or $R^7$ position. The optimum position for substitution is at the $R^7$ position to obtain the highest degree of efficiency. For a more complete description of these hydrocarbyl-substituted 8-hydroxyquinolines, see Republic of South Africa specification No. 69/4397 to Budde Jr. et al, assigned to Ashland Oil, Inc.

Representative compounds useful for ion exchange and within the scope of the above general formula I are: 7-octylbenzyl-8-hydroxyquinoline, 7-dodecyl benzyl-8-hydroxyquinoline, 7-nonylbenzyl-8-hydroxyquinoline, 7-ditertiarybutyl benzyl-8-hydroxyquinoline, 7-hexadecenyl-8-hydroxyquinoline, 7-dibenzyl-8-hydroxyquinoline, 7-dimethyldicyclopentadienyl-8-hydroxyquinoline, 7-dicyclopentadienyl-8-hydroxyquinoline, 7-dodecylphenyl-8-hydroxyquinoline, 7-phenyldodecenyl-8-hydroxyquinoline, and the like where one or more of the hydrocarbyl groups R are attached to ring carbon atoms in the 2nd, 3rd, 4th, 5th and 6th positions. Mixtures of these 8-hydroxyquinoline derivatives can be used if desired.

The extracting medium should be immiscible with water or otherwise readily separable from aqueous solutions, in order to improve the economic efficiency of the process. If the extracting medium were not readily separable from the water, or aqueous solution, a substantial loss of the extracting reagent would occur during each extraction, i.e., there would be at least a partial solubility in the aqueous phase and a loss of the extracting agent in the aqueous raffinate. Therefore, generally, immiscible extracting mediums are utilized. The extracting agent can be itself a liquid which is completely immiscible with water, or aqueous solutions, or as is commonly the case, the extracting agent is dissolved in a solvent for the extracting agent which is substantially immiscible with water, to form a water-immiscible extracting medium.

It has been found when utilizing the commercially available hydrocarbon-substituted 8-hydroxyquinolines that they can be dissolved into solutions containing from about 2 to about 50% and preferably from about 5 to about 30% by weight of the extracting agent and remain economically useful and sufficiently active to remove the nickel and/or cobalt values from the aqueous solution while being sufficiently dilute so that substantially no extracting agent is leached and lost in the aqueous raffinate. If it is desired, however, more concentrated solutions can be utilized. Mixtures of extracting agents can be used as long as they are not jointly reactive and do not interfere with the process of this invention.

Such solvents include generally any inert hydrocarbons which are solvents for the extracting agent, per se, and for the metal-extracting agent complex, and which do not react with any of the other materials present under the conditions of the extraction process. Generally, liquid aliphatic, cycloaliphatic, aromatic, cycloaliphatic-aromatic, aliphatic-aromatic or chlorinated such hydrocarbons are preferably utilized as the solvents for the metal-extracting medium. Optimally, the solvent has specific gravity in the range of from about 0.65 to about 0.95 and a mid-boiling point in the range of from about 120 to 615° F. (ASTM distillation). However, substantially any liquid can be used as a solvent-diluent that meets the following criteria:

1. A solvent for the extracting agent;
2. A solvent for the extracting agent-metal complex;
3. Immiscible with water; and
4. Readily separable from water.

Examples of suitable solvents include benzene, toluene, xylene, aliphatic and aromatic petroleum fractions such as naphtha and derivatives thereof and mixtures of the foregoing. In addition to the aliphatic, aromatic, cycloaliphatic-aromatic, aliphatic-aromatic hydrocarbons and cycloaliphatic hydrocarbons, chlorinated such hydrocarbon liquids can also be usefully utilized.

Light fuel oil, high flash point kerosene and other petroleum hydrocarbons, such as hexane-heptane mixtures are preferred. Generally, the aliphatic materials are most preferred because of their ready availability and ease of separation from the aqueous phase.

The concentration of the extracting agent in the solvent is determined not only by the solubility of the extracting agent per se, but also by the solubility of the extracting agent-metal complex.

In addition to the solvent and the extracting agent, there can preferably also be present in the extracting medium a phase modifier which prevents formation of an emulsion with, or entrainment of, the organic phase in the aqueous phase. This is accomplished, it is believed, by altering the interfacial tension and related physical properties of the organic-aqueous mixture during extraction. These phase modifiers are generally most useful when an aliphatic solvent is utilized and include, preferably, aliphatic alcohols containing from about 8 to about 16 carbon atoms, such as n-octyl alcohol, n-decyl alcohol, n-dodecyl alcohol, n-tetradecyl alcohol, n-hexadecyl alcohol, isooctyl alcohol, 2-ethylhexyl alcohol, cyclohexanol and mixtures of these and other alcohols Decanol is a preferred material.

Generally no more than the necessary amount of the phase modifier, e.g., alcohol, which is necessary to inhibit the formation of the emulsion or prevent entrainment, should be used. Usually no more than about 25% by volume of the phase modifier is necessary. Preferably, from about 2 to about 10% by volume is satisfactory and not more than about 5% is most preferred. The phase modifier can be completely eliminated if desired, and, therefore, is optional in the present procedure.

When utilizing liquid-liquid extraction from an aqueous solution of mixed metal values, a wide range of aqueous phase-to-aqueous-immiscible-phase volume ratio can be utilized in the present invention. Generally, using a 20% by wt. solution of an 8-hydroxyquinoline, aqueous-immiscible/aqueous phase volume ratios of from about 10:1 to about 1:10 are desirable.

The extracting steps and the stripping steps in the present process are preferably carried out by liquid-liquid contact utilizing any conventional liquid-liquid contact apparatus. The procedure can be carried out in a single stage batch operation or in a continuous flow unit. Preferably, in a continuous unit, the flow of the two phases is counter-current, such as in a continuous counter-current mixer-settler unit, or in a pulse column.

Useful apparatus in addition to mixer-settler units and pulse columns include, for example, packed and plate-type towers, and baffled towers, preferably, operated countercurrently.

The number of stages can be varied, as required, based on the efficiency of extraction and stripping of the specific materials being treated and of the apparatus being utilized. By adjusting the relative volumes of the aqueous metal salt solution and of the water-immiscible extracting medium, it is possible to obtain substantially complete extraction of the cobalt value from the aqueous solution into the extracting medium. Similarly, by adjusting the ratio of the organic extract phase ot the aqueous stripping liquid, substantially complete stripping of the cobalt value from the extract phase into the stripping liquid can also be obtained. It is recognized that there can be a residual cobalt metal value remaining in the extracting medium following stripping. The extracting medium containing this residual cobalt value can be recycled for further extraction use.

The phase volume ratio for the stripping procedure, i.e., aqueous stripping liquid-to-water-immiscible extracting medium, is preferably in the range of from about 10:1 to about 1:10.

Generally, temperature is not an important parameter in carrying out the process of the present invention. The separation and stripping procedures can be carried out in any temperature below the boiling point of the various solutions, organic and aqueous, and preferably at substantially ambient temperatures.

The nickel-cobalt separation procedures of this invention, can be applied to pregnant aqueous solutions which are derived from the leaching of various nickel- and cobalt-containing ores, as well as some other sources, e.g. spent electroplating solutions and spent stainless steel liquors from which it is desired to scavange the nickel and cobalt values.

The following examples described preferred embodiments of the present invention, but are exemplary and not exclusive of the scope of this invention.

EXAMPLES 1–3

An aqueous solution of nickel chloride and cobalt chloride, having a pH of about 3 and containing 49.6 grams per liter of nickel (as nickel chloride) and 9.6 grams per liter of cobalt (as cobalt chloride) and 75.2 grams per liter (g/L) ammonium chloride, was treated by bubbling ammonia gas therethrough until the pH of the solution was increased to about 8. The aqueous solution was admixed in a single stage with a water-immiscible organic phase comprising 10% by volume 7-[3-(5,5,7,7-tetramethyl-1-octenyl)]-8-hydroxyquinoline, 30% by volume isodecanol and 60% by volume Napoleum hydrocarbon solvent. The two solutions were mixed until they reached equilibrium and were then permitted to settle out. The two phases were separated by decantation and the weight of nickel and cobalt value, respectively, in each of the aqueous raffinate and organic extract, respectively, were obtained. The volume ratio of the aqueous feed solution-to-organic extracting solution, in this case, was 50/91. The relative weights of nickel and cobalt in each of the aqueous and organic phases are set forth as the extraction factor ($E_{metal}$) and is equal to $$\frac{\text{Weight of metal in organic phase}}{\text{Weight of metal in aqueous phase}}$$

The same procedure was carried out with other aqueous solutions at increasing pHs. The results of these tests are set forth in Table 1, below.

Table I

| pH | Nickel Chloride Content As Nickel | Cobalt Chloride Content As Cobalt | Ammonium Chloride Content | Aqueous Phase Organic Phase Ratio | $E_{Ni}$ | $E_{Co}$ | $\frac{E_{Co}}{E_{Ni}}$ |
|---|---|---|---|---|---|---|---|
| 8.0 | 49.6g/L | 9.6g/L | 75.2g/L | 50/91 | 0.074 | 1.45 | 19.6 |
| 9.1 | 36.7g/L | 7.0g/L | 51.3g/L | 100/138 | 0.053 | 1.9 | 35.9 |
| 9.4 | 25.5g/L | 4.9g/L | 38.6g/L | 100/91 | 0.032 | 3.38 | 105.5 |

As shown from the above tests, there is a preferential separation of cobalt from the aqueous solution into the organic extract at a pH of 8.0. However, there is a substantial improvement once the preferred range of pH is reached for the aqueous solutions and at pH of 9.1 and especially at pH of 9.4, a drastic improvement is shown. It should be noted that during the mixing stage in the above procedures, ammonia gas was continuously slowly bubbled through the mixed solutions to maintain the pH at the desired level.

COMPARATIVE EXAMPLES

An aqueous solution containing 60 grams per liter of manganese chloride, 2.94 grams per liter nickel chloride and 0.565 grams per liter cobalt chloride (all concentrations given in terms of the metal value) was provided at a pH of about 4. This aqueous solution was admixed with the organic extracting solution described above in Example 1. The two solutions were mixed until they were substantially at equilibrium and then permitted to separate. The organic and aqueous phases where then separated by decantation and each solution was tested for its manganese content, nickel content and cobalt content. The same test was repeated for other aqueous solutions containing the above three metal values at progressively increasing pHs up to value 7.1. The results of each of these comparative tests are set forth in Table 2, below:

Table 2

| pH | Manganese Chloride Content As Manganese | Nickel Chloride Content As Nickel | Cobalt Chloride Content As Cobalt | $E_{Mn}$ | $E_{Ni}$ | $E_{Co}$ | $\frac{E_{Co}}{E_{Ni}}$ |
|---|---|---|---|---|---|---|---|
| 4.0 | 60g/L | 2.94g/L | 0.565g/L | 0.00014 | 1.84 | 0.16 | 0.08 |
| 5.6 | 60g/L | 2.94g/L | 0.565g/L | 0.0015 | 6.52 | 8.3 | 1.25 |
| 6.3 | 60g/L | 2.94g/L | 0.565g/L | 0.0037 | 7.25 | 13.0 | 1.8 |
| 7.1 | 60g/L | 2.94g/L | 0.565g/L | 0.0075 | 3.7 | 11.1 | 3.0 |

As is shown by Table 2, the comparative examples all indicated that at pH's of about 7 or lower, the separation of cobalt from nickel is relatively insignificant. It varies in accordance with pH but the degree of separation is slight. It is only at higher pH values, as set forth in Examples 1–3, where a substantial effect is shown for separating the cobalt from the nickel. Thus, there is obviously a qualitative difference in effect between the extraction of nickel and cobalt from aqueous solution, using the extracting agents in accordance with the present process, at pH values of 7 or lower, as compared to the same agents when carried out on aqueous solutions at a pH of 8 or above.

The embodiments of this process which are claimed as follows:

1. Method of separating dissolved cobalt value from dissolved nickel value from a pregnant aqueous ammoniacal solution, containing sufficient dissolved ammonia to maintain the nickel and cobalt dissolved in the aqueous solution, having a pH in the range of at least about 8.5 and comprising at least about 7 grams/liter dissolved ammonium halide measured as ammonium ion; the process comprising:

contacting the nickel- and cobalt-containing aqueous solution with an organic liquid ion exchange medium comprising an ion exchange agent selected from the group consisting of 7-hydrocarbon-substituted-8-hydroxyquinolines, while maintaining the aqueous solution at a pH of at least about 8.5, to form an organic extract phase containing the cobalt value and an aqueous phase depleted in cobalt value; and separating the organic extract phase from the aqueous phase; whereby cobalt is preferentially extracted into the organic extract phase.

2. The method of claim 1, wherein the halide is chloride.

3. The process of claim 2, wherein the pregnant aqueous solution is maintained at a pH in the range of from about 9.1 to about 9.4, when it is in contact with the liquid ion exchange medium.

4. The method of claim 1, comprising in addition stripping the cobalt value from the organic extract by contacting the organic extract with an acid solution having a concentration at least 6 Normal in hydrogen ion and chloride ion.

5. The method of claim 1, wherein the 7-hydrocarbon-substituted-8-hydroxyquinoline is substituted by a substituent selected from the group consisting of alkylbenzyl groups and beta-alkenyl groups, containing from about 12 to about 18 carbon atoms.

6. The method of claim 1, wherein the liquid ion exchange medium comprises a solution of the ion exchange agent in a water-immiscible organic hydrocarbon liquid.

7. The method of claim 1, wherein the nickel and cobalt values are present in the pregnant aqueous solution as the halides.

8. The process of claim 1, wherein the pregnant aqueous solution is maintained at a pH of at least about 9 when it is in contact with the liquid ion exchange medium.

9. The process of claim 1, wherein the pregnant aqueous solution is maintained at a pH in the range of from about 9 to about 10, when it is in contact with the liquid ion exchange medium.

10. The process of claim 1, wherein the liquid ion exchange medium comprises a solvent which is immiscible with water, but is a solvent for the extracting agent.

11. The process of claim 10, wherein the solvent is an organic liquid.

12. The method of claim 1, wherein the nickel and cobalt values are present in the pregnant aqueous solution as chlorides.

13. The process of claim 12, wherein the pregnant aqueous solution is maintained at a pH of at least about 9 when it is in contact with the liquid ion exchange medium by the substantially continuous addition of ammonia during the period the aqueous solution is in contact with the organic medium.

14. The process of claim 1, wherein the ammonium halide is present in a concentration of at least about 12 gm/l, measured as ammonium ion.

15. Method of separating dissolved cobalt value from dissolved nickel value from a pregnant aqueous ammoniacal solution, containing sufficient dissolved ammonia to maintain the nickel and cobalt dissolved in the aqueous solution, having a pH in the range of at least about 9, and comprising dissolved ammonium ion and chloride ion, representing an ammonium chloride concentration of at least about 38 grams/liter, the process comprising:

contacting the nickel- and cobalt-containing aqueous solution with an organic liquid ion exchange medium comprising an ion exchange agent selected from the group consisting of 7-hydrocarbon-substituted-8-hydroxyquinolines, the hydrocarbon group having at least about eight carbon atoms, while maintaining the aqueous solution at a pH of at least about 9 to form an organic extract phase containing the cobalt value and an aqueous phase depleted in cobalt value, and separating the organic extract phase from the aqueous phase; whereby cobalt is preferentially extracted into the organic extract phase.

16. The process of claim 15, wherein the pH of the aqueous solution is maintained in the range of from about 9 to about 10.

17. The process of claim 16, wherein the nickel and cobalt values are present in the aqueous solution as the chlorides.

18. Method of obtaining cobalt value substantially free from nickel value from a pregnant aqueous ammoniacal solution, comprising dissolved nickel, cobalt and copper value, and containing sufficient dissolved ammonia to maintain the nickel and cobalt dissolved in the aqueous solution, the pregnant aqueous solution having a pH in the range of at least about 9, and comprising dissolved ammonium ion and chloride ion, representing an ammonium chloride concentration of at least about 20 grams/liter, the process comprising:

contacting the pregnant aqueous solution with an organic liquid ion exchange medium comprising an ion exchange agent selected from the group consisting of 7-hydrocarbon-substituted-8-hydroxyquinolines while maintaining the aqueous solution at a pH of at least about 9, to form an organic extract phase containing the cobalt value and the copper value and an aqueous phase depleted in cobalt and copper value; separating the organic extract phase from the aqueous phase; contacting the organic extract phase with a weakly acid aqueous solution containing sufficient amount of hydrogen ions to selectively exchange the copper from the organic phase, to form an aqueous phase containing the copper value and an organic phase depleted in copper value; and separating the aqueous phase from the organic phase; whereby cobalt is obtained in the organic phase.

19. A method of separating dissolved cobalt value from dissolved nickel value from a pregnant aqueous ammoniacal solution, containing sufficient dissolved ammonia to maintain the nickel and cobalt dissolved in the aqueous solution, having a pH in the range of from about 9.1 to about 9.4 and comprising at least about 38 grams/liter of dissolved ammonium chloride, the cobalt and nickel values representing cobalt chloride and nickel chloride, the process comprising:

contacting the nickel- and cobalt-containing aqueous solution with an organic liquid ion exchange medium comprising an ion exchange agent selected from the group consisting of 7-hydrocarbon-substituted-8-hydroxyquinolines, the hydrocarbon group having at least about eight carbon atoms while maintaining the aqueous solution at a pH in the range of about 9.1 to 9.4, to form an organic extract containing the cobalt value and an aqueous phase depleted in cobalt value, and separating the organic extract phase from the aqueous phase; whereby cobalt is preferentially extracted into the organic extract phase.

20. The method of claim 19, wherein the 7-hydrocarbon-substituted-8-hydroxyquinoline is substituted by a substituent selected from the group consisting of alkylbenzyl groups and beta-alkenyl groups, containing from about 12 to about 18 carbon atoms.

* * * * *

UNITED STATES PATENT AND TRADEMARK OFFICE
CERTIFICATE OF CORRECTION

PATENT NO. : 4,012,483
DATED : March 15, 1977
INVENTOR(S) : WILLIAM S. KANE; PAUL H. CARDWELL It is certified that error appears in the above-identified patent and that said Letters Patent are hereby corrected as shown below:

Column 10, line 11 (Claim 14, line 2), change "12" to read: --13--.

Signed and Sealed this

Seventh Day of June 1977

[SEAL]

Attest:

RUTH C. MASON
*Attesting Officer*

C. MARSHALL DANN
*Commissioner of Patents and Trademarks*